United States Patent [19]

Yamamoto

[11] Patent Number: 5,623,192

[45] Date of Patent: Apr. 22, 1997

[54] APPARATUS FOR CARRYING OUT CURRENT CONTROL FOR VARIABLE SPEED DRIVER AND METHOD FOR CARRYING OUT CURRENT CONTROL THEREFOR

[75] Inventor: Yasuhiro Yamamoto, Tokyo, Japan

[73] Assignee: Kabushiki Kaisha Meidensha, Tokyo, Japan

[21] Appl. No.: 193,052

[22] PCT Filed: Jul. 16, 1993

[86] PCT No.: PCT/JP93/00986

§ 371 Date: Mar. 3, 1994

§ 102(e) Date: Mar. 3, 1994

[87] PCT Pub. No.: WO95/02921

PCT Pub. Date: Jan. 26, 1995

[51] Int. Cl.$^6$ ........................................ H02P 5/28
[52] U.S. Cl. ...................... 318/811; 318/801; 318/798; 363/26; 363/41; 388/811
[58] Field of Search ...................... 318/800–815, 318/599, 799, 798, 561, 254, 138; 388/800–815, 819; 363/13, 26, 28, 40, 41, 178, 36, 71

[56] References Cited

U.S. PATENT DOCUMENTS

| 4,847,743 | 7/1989 | Kamiyama | 363/41 |
| 5,023,538 | 6/1991 | Mutoh et al. | 318/811 |
| 5,369,345 | 11/1994 | Phan et al. | 318/561 |
| 5,376,872 | 12/1994 | Hara | 318/799 |
| 5,416,686 | 5/1995 | Azuma et al. | 363/36 X |
| 5,436,823 | 7/1995 | Araki | 363/71 |

FOREIGN PATENT DOCUMENTS

| 0351783A2 | 1/1990 | European Pat. Off. . |
| 3817338A1 | 12/1988 | Germany . |
| 1-274669 | 11/1989 | Japan . |
| 2-206398 | 8/1990 | Japan . |
| 3-118793 | 5/1991 | Japan . |
| 3-215182 | 9/1991 | Japan . |

OTHER PUBLICATIONS

Patent Abstracts of Japan, vol. 14, No. 45 (E–0880), Jan. 26, 1990.
Patent Abstracts of Japan, vol. 15, No. 494 (E–1145), Dec. 13, 1991.

Primary Examiner—Karen Masih
Attorney, Agent, or Firm—Foley & Lardner

[57] ABSTRACT

An apparatus for carrying out a current control and method therefor are disclosed in which the current control is such that no 0 vector defect is present by switching from a three-arm modulation method to a two-arm modulation method in the vicinity to a voltage saturation in a PWM inverter using the three-arm modulation method. The structure of the current control apparatus is such that in the PWM inverter using the three-arm modulation method having a time point data preparing section which prepares a time point data for the three-arm modulation mode from voltage vector times T λ, Tμ, and To derived by a PWM pattern calculation section (31) and a time point chaneover switch (33) which changes the time point data to each phase time point, a time point data preraring section (41) which prepares the time point data for the two-arm modulation mode from the voltage vector times is provided, a comparator (45) having a so-called hysterisis (window-formed) characteristic which compares the 0 vector time To and dead time compensation set value K.Tdly is provided so that when the 0 vector time becomes smaller, the modulation changeover switch (47) outputs a signal to the time point changeover switch (33) so that the data of the time point data preparing section (41) gives the PWM pattern of the two-arm modulation method.

5 Claims, 6 Drawing Sheets

☆ MOVEMENT OF O VECTOR DUE TO DEAD TIME COMPENSATION

APPARATUS FOR CARRYING OUT CURRENT CONTROL FOR VARIABLE SPEED DRIVER AND METHOD FOR CARRYING OUT CURRENT CONTROL THEREFOR

TECHNICAL FIELD

The present invention relates to an apparatus for carrying out a current control for a so-called variable speed driving system (hereinafter, referred to as a variable speed driver) which improves a current control characteristic in a proximity to a voltage saturation in an electric current control system of a voltage type PWM inverter and a method for carting out the current control therefor.

BACKGROUND ART

FIG. 1 shows a structure of a variable speed driver using a voltage type PWM (Pulse Width Modulation) inverter disclosed in a Japanese Patent Application No. Heisei-2-7983 filed on Jan. 17, 1990.

In FIG. 1, numeral 1 denotes a vector control section using data on a speed or torque instruction and speed detection and so forth, numeral 2 denotes an ACR (current) control section which carries out current control calculations in response to a current instruction derived from the vector control section, numeral 3 denotes a PWM pattern generator which calculates a three-phase PWM pattern according to a voltage amplitude of a voltage space vector and phase instruction derived from the ACR control section and issues a PWM instruction on the basis of the calculated PWM pattern, numeral 4 denotes a dead time compensator, numeral 5 denotes a gate signal circuit, numeral 6 denotes a drive circuit, numeral 7 denotes an inverter circuit, and numeral 8 denotes an induction motor.

Furthermore, in FIG. 1, numeral 9 denotes a voltage detector, numeral 10 denotes a current detector, numeral 11 denotes a speed detector, numeral 12 denotes a sample hold circuit which holds an instantaneous output current in synchronization with an intermediate sample hold signal of a 0 (zero) vector from the PWM pattern generator until an A/D conversion is carried out, numeral 13 denotes an A/D converter, numeral 22 denotes an adder which derives a power supply speed $\omega_o$ from a rotor speed $\omega_r$ of the speed detector 11 and a slip angular velocity $\omega_s$.

FIG. 5 shows a circuit block of the PWM pattern generator 3. In FIG. 5, numeral 31 denotes a PWM pattern calculation block which receives a voltage instruction |V| derived from the ACR control section 1, an output voltage phase φ restriced between 60° from an output voltage phase instruction θv, a DC power supply voltage Vdc, and PWM carrier wave period (PWM time) Tc, calculates the PWM pattern using a circle approximation method, and outputs voltage vector times Tλ and Tμ whose phases are mutually different by 60°, and 0 vector time To.

Next, numeral 32 denotes a three-arm modulating time data preparation section which prepares time data such that 0 vector time To is divided into half To/2 to both sides of the voltage vector times Tλ and Tμ during a half PWM time Tc/2 as shown in FIG. 6 and outputs time data of $T_1$, $T_2$, and $T_3$.

In addition, numeral 33 denotes a time changeover switch which converts the time data of $T_1$, $T_2$, and $T_3$ into each phase voltage time Tu, Tv, and Tw and numeral 24 denotes and ON/OFF switching circuit which performs the switching of Tu, Tv, and Tw and outputs each please voltage signal Vu, Vv, and Vw (PWM pattern).

It is noted that, in FIG. 5, numeral 35 denotes a mode selection circuit for every 60° of the output voltage phase θv from the ACR control section, numeral 36 denotes a reference phase output table which receives the output signal of the every-60° mode circuit 35 and outputs a reference phase φλ for every 60°, numeral 37 (namely, a symbol ±○ in FIG. 5) denotes a subtractor which subtracts the reference phase φλ for every 60° from the output voltage phase φv and outputs the output voltage phase φ restricted between 60° to the PWM pattern calculation block 31, numeral 38 denotes a switch selection table which controls the time changeover switch 33 according to the output of the every-60° mode selection circuit 35 for every 60°, and numeral 39 denotes a switching ON/OFF control circuit which controls the ON/OFF switching circuit according to the PWM time Tc and performs the sampling operation for the current.

Anyway, the above-described PWM pattern is calculated using the circle approximation method with 0 vector time To being divided into half To/2 to be inserted into both sides of the times Tλ and Tμ to output the times data and with the current being coupled at an interval point of the PWM pattern (this is hereinafter referred to as a three-arm modulation method). This methos resulted in such a way that as the output voltage becomes higher, a width of 0 vector becomes narrower.

As the width of 0 vector becomes narrower, a defect (nullfied or defeciency of 0 vector (hereinafter, referred to simply as 0 vector defect) occurs due to a dead time compensation. At this time, a locus of a current vector is moved toward a direction at which a radius becomes larger.

FIGS. 7 (A) and 7 (B) show vectors before 0 vector defect and those after 0 vector defect. As shown in FIG. 7 (B), 0 vector interval of time at a point B is moved to a point D due to the dead time compensation. In a case where 0 vector is defected at the point of B and 0 vector appears earlier at the point of D, a locus of the current vector is as shown in FIG. 8.

In this case, the locus of the current vector is the same at points of ⌈5⌋ and ⌈6⌋ but the locus thereof becomes long in time at a point of ⌈3⌋.

Therefore, the current vector is accordingly moved largely. Since the current vectors at points of ⌈5⌋ and ⌈6⌋ remains unmoved, the current vector is present at a position translated from the points of ⌈5⌋ and ⌈6⌋ by an interval elongated at the point off ⌈3⌋ as compared with a locus of a current vector (not shown) in the case of FIG. 7 (A) in which 0 vector is not defected. The interval of time of the vector at a point of ⌈7⌋ becomes shorter by the increase in the 0 vector. The 0 vector interval at a point of ⌈8⌋ becomes longer by 0 vector interval which should be in the interval of ⌈3⌋. Consequently, an end of ⌈9⌋ coincides with a point of the beginning of ⌈1⌋.

In other words, if 0 vector defect occurs, a point of the final locus of the current vector becomes equal to a part wherein 0 vector is not present. However, the locus during that interval is translated toward a direction at which the current radius becomes large. Therefore, an integrated value of the current at that interval becomes larger than that of the current in which 0 vector defect is not present. Consequently, the current becomes different according to a position in which 0 vector is inserted even though the PWM pattern is generated with the same voltage component.

With the above-described problem in mind, it is an object of the present invention to provide an apparatus and method for carrying out a current control for a variable speed driver which improves the ACR control characteristic at a position placed in a proximity to a voltage saturation by exchanging the PWM pattern from the three-arm modulation method to the two-arm modulation method at a vicinity to the voltage saturation, the ACR control system being unchanged.

DISCLOSURE OF THE INVENTION

The apparatus for carrying out the current control for the variable speed driver according to the present invention comprises: a PWM pattern calculation section which is so constructed as to calculate a three-phase PWM pattern from a voltage instruction and an output voltage phase off a current control section; a three-arm modulating time data preparation section which is so constructed as to prepare times data for a three-arm modulation from a voltage vector time including a 0 vector time calculated by the PWM pattern calculation section; a time changeover switch which switches the times data into each phase time; a two-arm modulation time data preparation section which prepares the times data in a two-arm modulation method from the voltage vector time; a comparator which is so constructed as to compare the 0 vector time and a dead time compensation value and outposts a three-arm/two-arm modulation switching signal when the 0 vector time becomes shorter; and a modulation changeover switch which switches between the three-arm modular ion time data and the two-arm modulation time data in response to the switching signal from the comparator and outputs either of them to the time changeover switch.

In addition, the comparator may alternatively have a characteristic of, so-called, hysterisis or window (two threshold levels of the comparator are changed according to the input direction of signal).

Furthermore, the comparator may alternatively compare the 0 vector time and a time which is proportional to the dead time compensation set value.

In addition, the method for carrying out the current control for the variable speed driver comprises the following steps of: calculating a three-phase PWM pattern from a voltage instruction and an output voltage phase of a current control section; preparing a time data for a three-arm modulation method from a voltage vector time including a voltage vector time including 0 vector time calculated at the previous step; providing a time changeover switch to change the time data into each phase time data; preparing a time data for a two-arm modulation method from said voltage vector time; comparing both 0 vector time and dead time compensation set value and outputting a three-arm/two-arm modulation switching signal when the 0 vector time becomes shorter; and providing a modulation changeover switch for switching between the three-arm modulation time data and the two-arm modulation time data in response to the switching signal at the third step and outputting either of them to the time changeover switch.

BEST MODE FOR CARRYING OUT THE INVENTION

Hereinafter, reference will be made to the drawings in order to facilitate a better understanding of the present invention.

Figure 2:
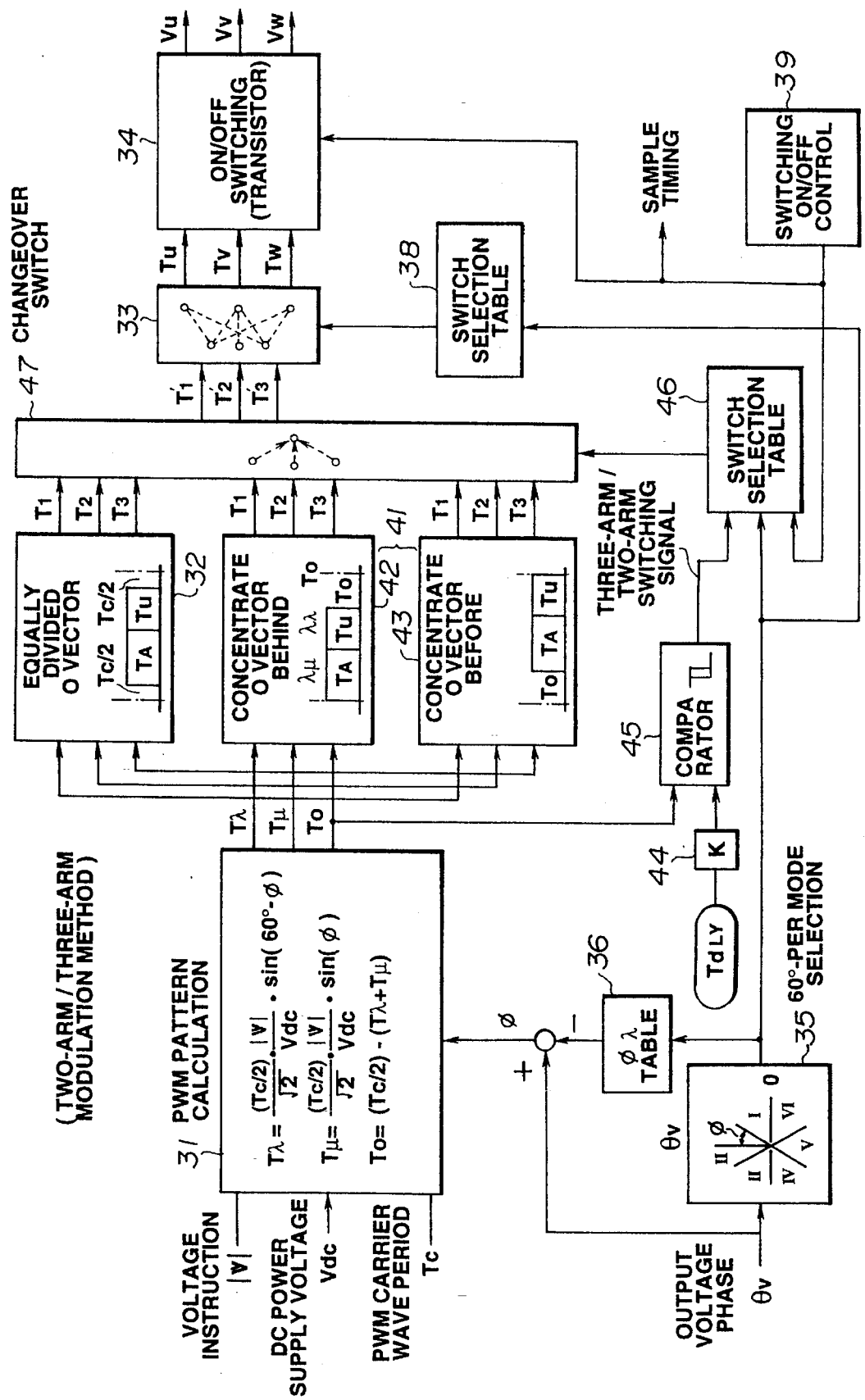
FIG. 2 is a functional block diagram of a PWM pattern generator indicating a preferred embodiment according to the present invention.

FIG. 2 shows a PWM pattern generator in a preferred embodiment according to the present invention.

Figure 5:
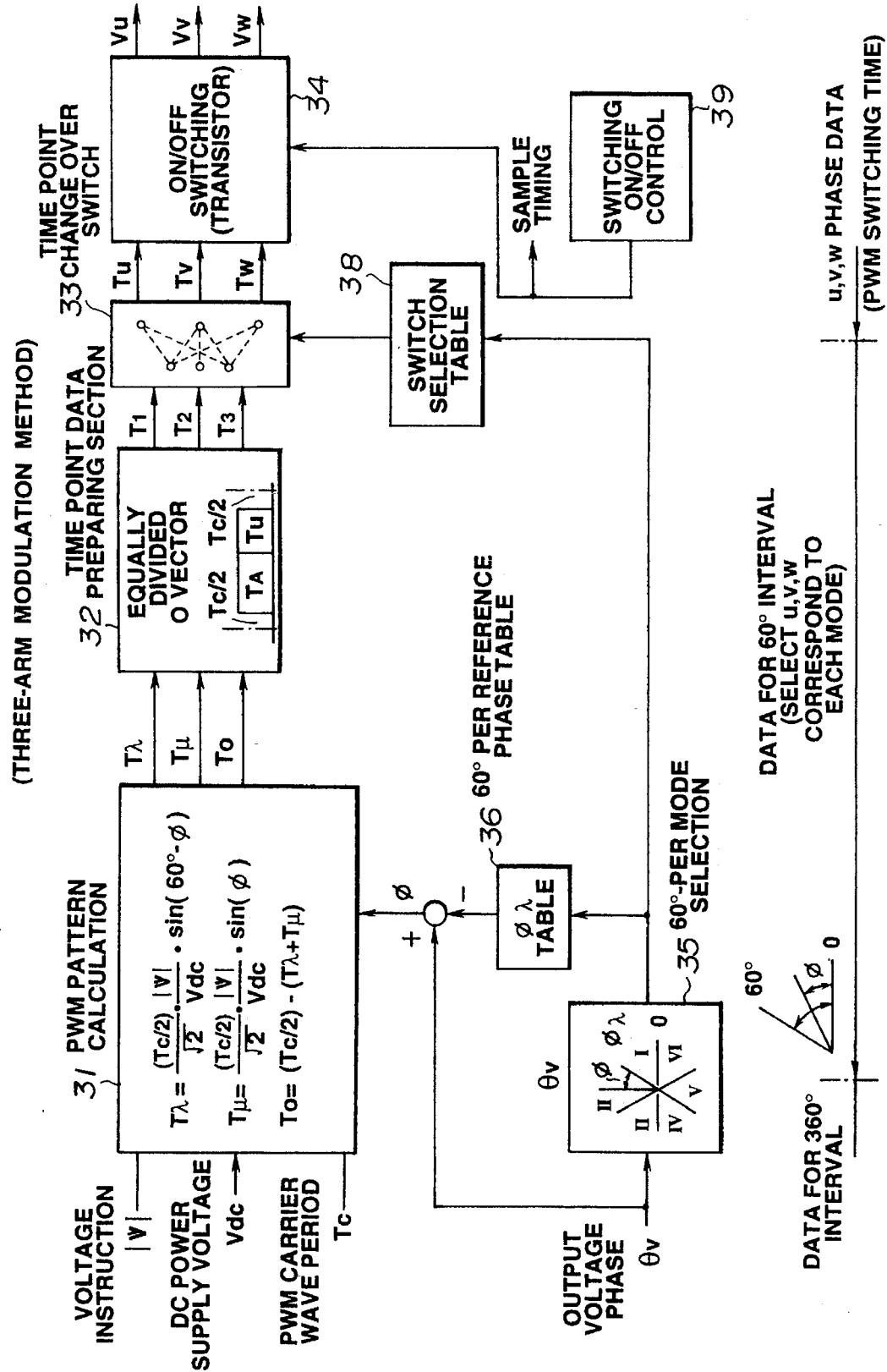
FIG. 5 is a functional block diagram of a conventional PWM pattern generator related to FIG. 1.
Figure 6:
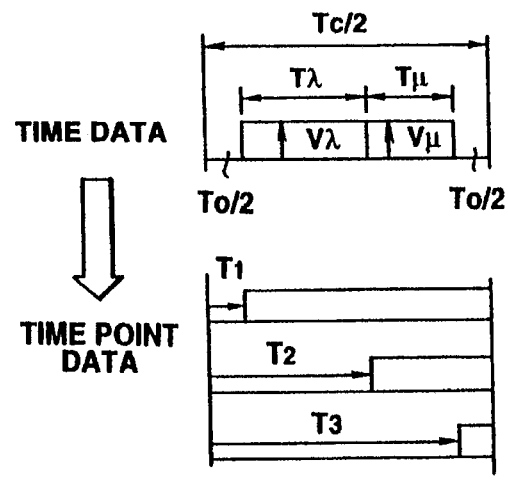
FIG. 6 is an explanatory view of a time data and time point data in a three-arm modulation method.
Figure 7A:
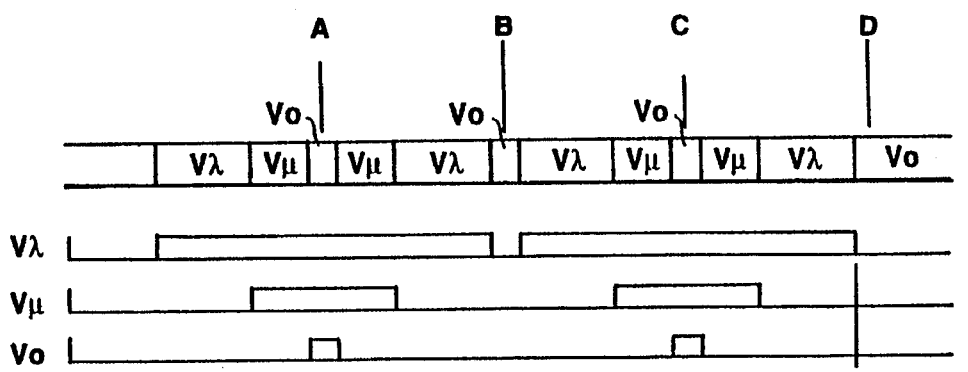
FIG. 7 is an explanatory view of movement of 0 vector.
Figure 7B:
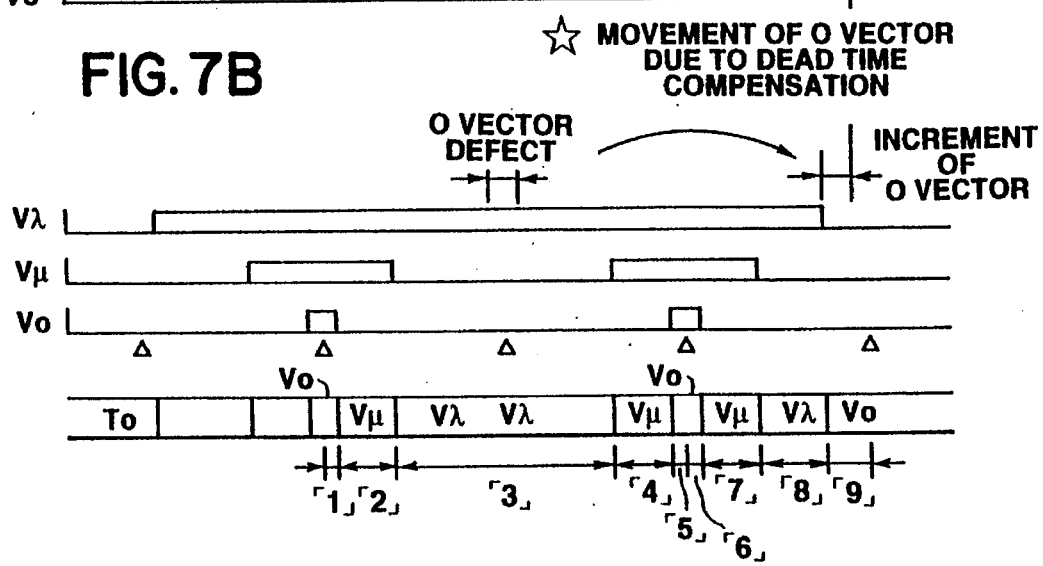
Figure 8:
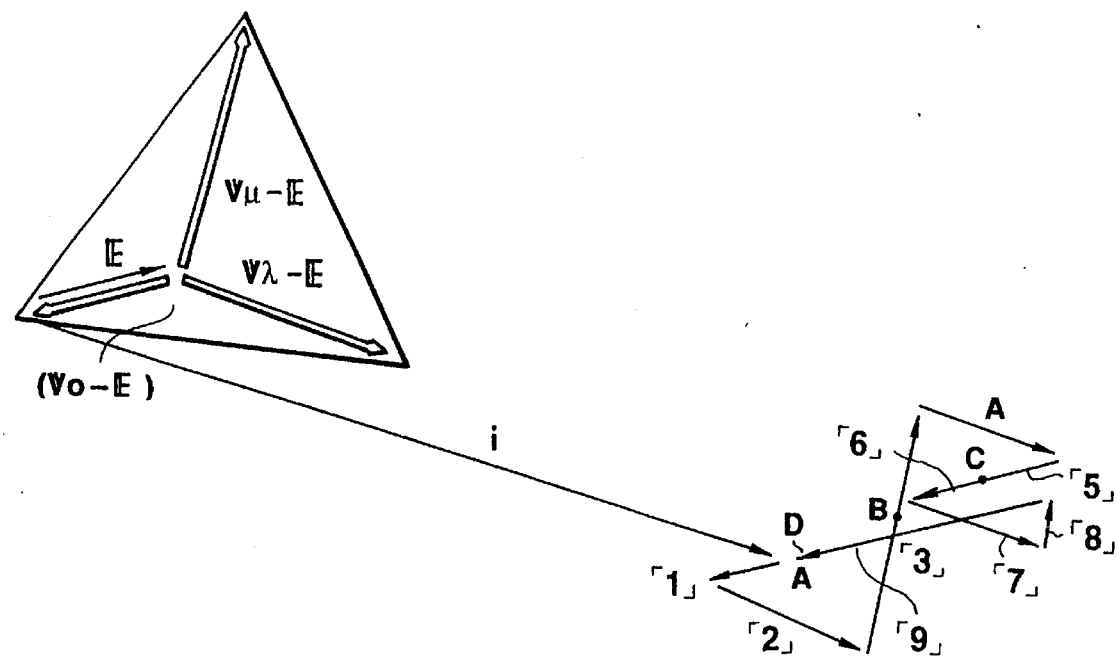
FIG. 8 is an explanatory view of the current vector locus when the 0 vector is moved.

It is noted that the same reference numerals as those shown in FIG. 5 designate the corresponding elements and the explanation of the same elements as those shown in FIG. 5 are omitted herein.

In FIG. 2, numeral 32 denotes a three-arm modulation times data preparing section, numeral 41 denotes a two-arm modulation times data preparing section constituted by first and second times data preparing sections denoted by numerals 42 and 43, numeral 42 denoting a time data preparing section which receives voltage vector times $T\lambda$ and $T\mu$, and 0 vector time To from the PWM pattern calculation block 31, concentrates the 0 vector time To into positions behind the times $T\lambda$ and $T\mu$ and which outputs the times data of $T_1$, $T_2$, and $T_3$, and numeral 43 denoting a times points data preparing section which receives the times $T\lambda$, $T\mu$, and To and outputs the time point data of $T_1$, $T_2$, and $T_3$ with the 0 vector time To concentrated into positions before the times $T\lambda$ and $T\mu$.

In addition, numeral 45 denotes a comparator of a so-called hysterisis (window-formed) type which receives both of a value of K.Tdly in which a dead time compensation set value Tdly is multiplied by a coefficient K at a percentage circuit block 44 and of the 0 vector time interval To and outputs a three-arm/two-arm modulation switching signal when To<K.Tdly.

Furthermore, numeral 46 denotes a switching selection table which receives outputs of the three-arm/two-arm modulation switching signal circuit (comparator) 45, every-60° mode selection circuit 35, and the switching ON/OFF control circuit 39, and outputs the three-arm/two-arm modulation switching data.

In addition, numeral 47 denotes a modulation changeover switch controlled by the data on the switching selection table 46. At the time of the three-arm modulation mode, the modulation changeover switch 47 directly outputs the times points data derived at the time point data preparing section 32 $T_1$, $T_2$, and $T_3$ in the form of $T_{\cdot 1}$, $T_{\cdot 2}$, and $T_{\cdot 3}$.

The modulation changeover switch 47 renders the PWM pattern generated in the three-arm modulation method from the ON/OFF switching circuit 34 to be output.

Figure 3:
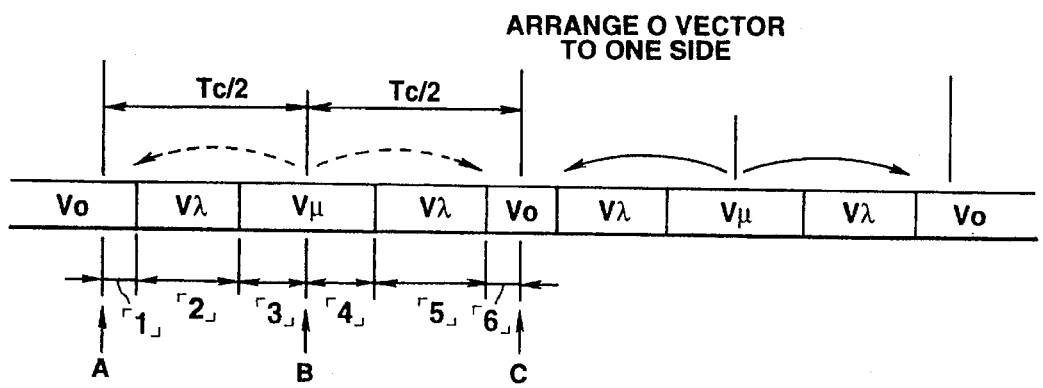
FIG. 3 is an explanatory view of 0 vector arrangement in the preferred embodiment of the PWM pattern generator shown in FIG. 2.

On the other hand, at the time of the two-arm modulation mode, the times points data $T_1$, $T_2$, and $T_3$ of the time (point) data preparing sections 42 and 43 modify such as those in which, as shown in FIG. 3, 0 vector time interval To during the conventional PWM half period is divided into half To/2 and To/2 is distributed into both sides before and after the voltage vector intervals Tλ, Tμ are modified as follows:

That is to say, (1) The 0 vector time during the half PWM period To/2 is directly set to either ends of time Tλ or Tμ.

(2) The time points data $T_1$, $T_2$, and $T_3$ are determined such that the half PWM period To/2 is determined in which side of the times Tλ and Tμ the half PWM period lies so that the 0 vector time continues during the next half PWM period 0 vector time.

(3) Points collecting 0 vector time To are modified for each output voltage phase 60° interval from the points to be objective thereof.

These (1) through (3) are switched according to the data of the switch selection table 46, the times points data $T_{,1}$, $T_{,2}$, and $T_{,3}$ are output so that the two-arm modulation method PWM pattern from the ON/OFF switching circuit 34 is output (corresponds to the two-arm modulation which is described on Page 809 of Electric Engineering paper, volume D. 109, No. 11 published on 1989).

Figure 1:
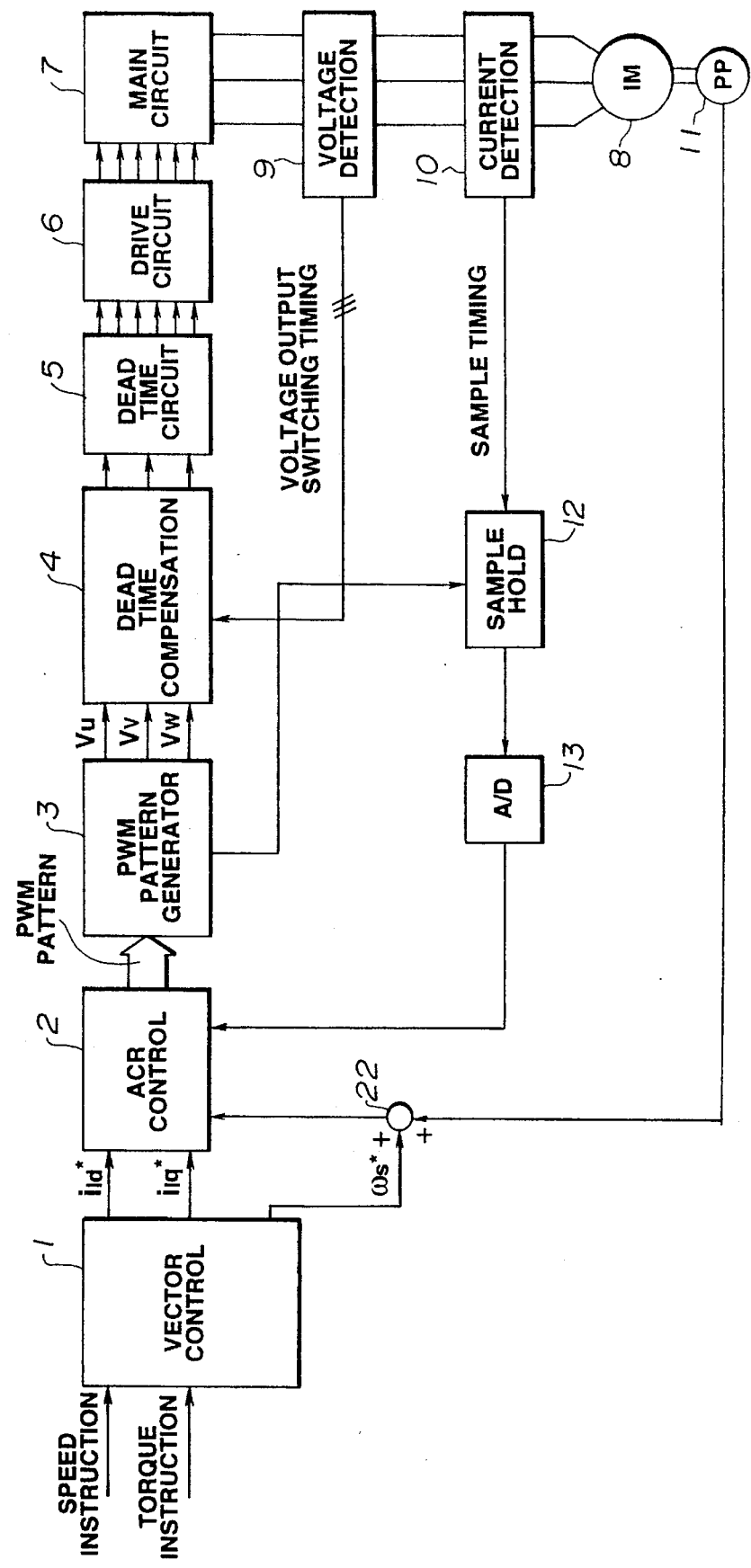
FIG. 1 is a circuit block diagram of a variable speed driver disclosed in the above-identified Japanese Patent Application No. Heisei 2-7983.
Figure 4:
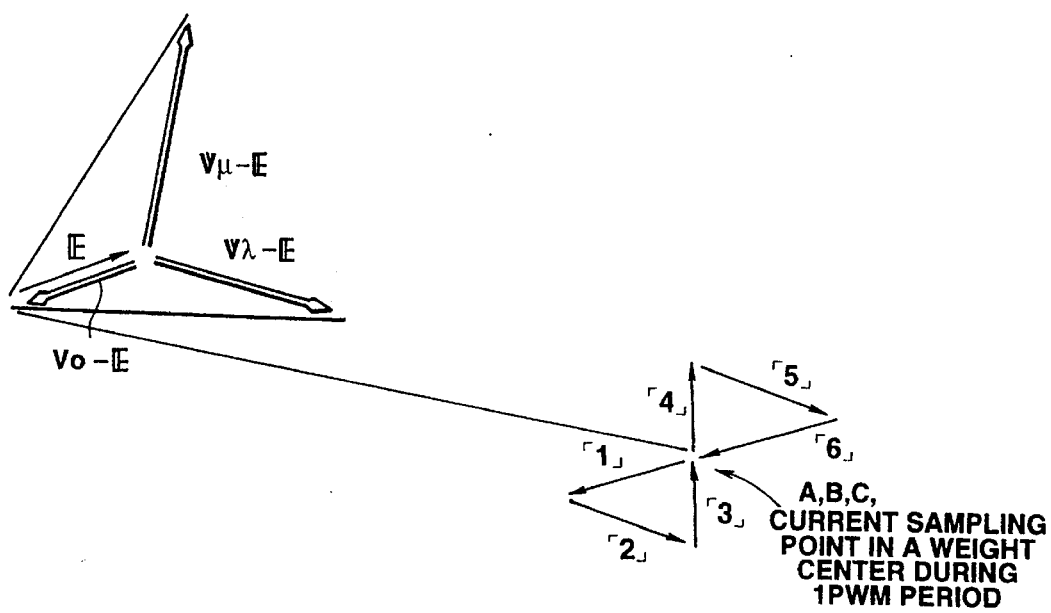
FIG. 4 is an explanatory view of a locus of a current vector in the preferred embodiment of the PWm pattern generator shown in FIG. 2.

The current sampling may be carried out for each PWM half period conventionally. A weight center between one 1 PWM period of the current locus as shown in FIG. 4 is sampled. Hence, the ACR control system of FIG. 1 (disclosed in Japanese Patent Application No. Heisei 2-7983) can directly be applied to the current sampling.

As described hereinabove, since in the apparatus and method for carrying out the current control of the variable speed driver according to the present invention, when the output voltage becomes high and width of the 0 vector becomes narrower, 0 vector defect will occur on the PWM pattern in the three-arm modulation method, the comparator compares the 0 vector time from the PWM pattern calculation section with the dead time compensation set value. Before the occurrence in the 0 vector defect, the switching signal is transmitted to the modulation changeover switch. The modulation changeover switch changes the time data in the case of the three-arm modulation method to the time data in the case of the two-arm modulation method, outputs it to the time changeover switch so that the current control by means of to the PWM pattern of the two-arm modulation method can appropriately be switched.

Although the two-arm modulation method has about twofold the current ripple as compared with the three-arm modulation method, the width of the 0 vector interval is twice that at the time of the three-arm modulation method so that the current control without 0 vector defect at the proximity to the voltage saturation can be achieved even though the output voltage becomes higher.

In addition, since the, so-called, hysterisis (window form) is provided for the comparator, no frequent repetitions between the two-arm modulation and three-arm modulation cannot be achieved any more in the proximity to the voltage saturation. Furthermore, since the time to be compared with the 0 vector time is a value in which the rate or percentage is multiplied by the dead time compensation value, the percentage is so modified that the switching timing between the three-arm modulation mode and the two-arm modulation time can be adjusted in response to the voltage instruction.

As described hereinabove, the present invention can have various superior applications in the industrial field.

I claim:

1. An apparatus for carrying out a current control including a PWM inverter, comprising:

a) a PWM pattern calculation section which calculates a three-phase PWM pattern and voltage vector times from a voltage instruction of a current control section and from an output voltage phase;

b) a three-arm modulation time point data preparing section which prepares a three-arm modulation time point data from the voltage vector times including an 0 vector time calculated by the PWM pattern calculation section;

c) a time changeover switch which performs a switching between the time point data from respective phase times;

d) a two-arm modulation time point data preparing section which prepares a two-arm modulation time point data from said voltage vector times;

e) a comparator which receives said 0 vector time and a set value in time of a dead time compensation and which produces three-arm and two-arm switching signals when the 0 vector time is less than the set value; and f) a modulation changeover switch which serves to switch said three-arm modulation time point data and said two-arm modulation time point data in response to the switching signal of said comparator and serves to output a signal indicative of the modulation switching to said time changeover switch, whereby the three-arm and two-arm modulation methods can be switched according to a magnitude of the voltage instruction derived through the current control section.

2. An apparatus for carrying out a current control including a PWM inverter as set forth in claim 1, wherein said comparator has a window-formed characteristic.

3. An apparatus for carrying out a current control including a PWM inverter as set forth in claim 1, wherein a time to be compared with the 0 vector time by means of said comparator is a value in which a percentage is multiplied by the set value.

4. A method for carrying out a current control including a PWM inverter, comprising the steps of:

a) calculating a three-phase PWM pattern and voltage vector times from a voltage instruction and an output voltage phase of a current control section;

b) preparing time point data for a three-arm modulation mode from the voltage vector times including an 0 vector time during the calculation of the three-phase PWM pattern;

c) performing each phase time of the time point data using a time changeover switch;

d) preparing the time point data of the two-arm modulation method from said voltage vector times;

e) comparing said 0 vector time and a set value in time of a dead time compensation and outputting the three-arm and two-arm modulation switching signals when said 0 vector time is less than said set value;

f) switching between the three-arm modulation time point data and two-arm modulation point data in response to the three-arm and two-arm modulation switching signals output at the step e) so as to use a modulation switch to output to the time changeover switch, whereby the switchings between three-arm modulation method and two-arm modulation method are carried out according to a magnitude of the voltage instruction derived through the current control section.

5. An apparatus for carrying out a current control including a PWM inverter as set forth in claim 2, wherein a time to be compared with the 0 vector time by means of said comparator is a value in which a percentage is multiplied by a dead time compensation set value.

* * * * *